Jan. 15, 1929.
B. A. GAYMAN
1,699,330
SLEEVE FOR ROLLER BEARINGS
Filed Dec. 6, 1926
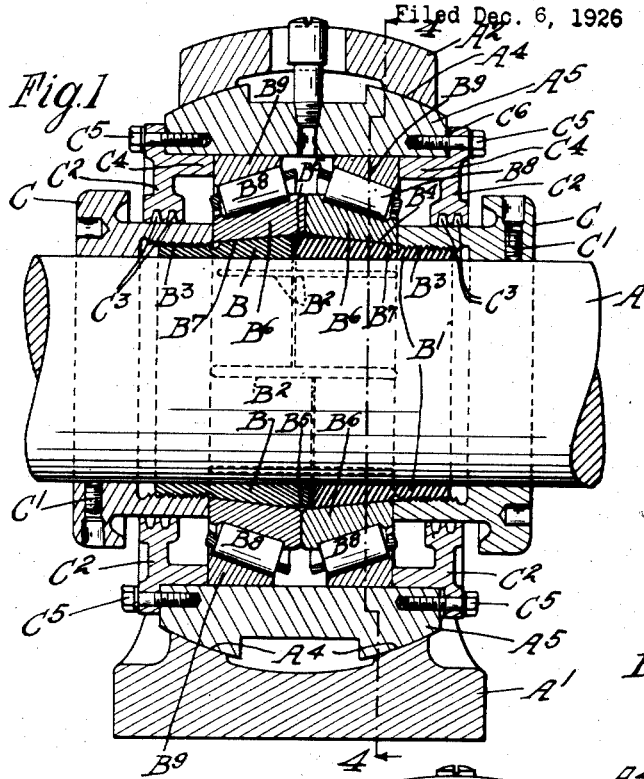
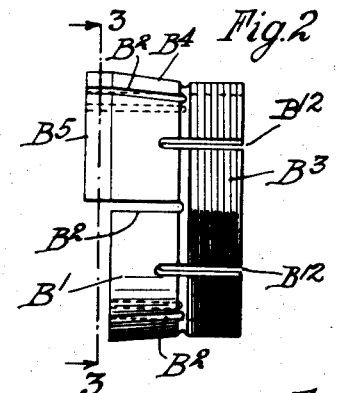
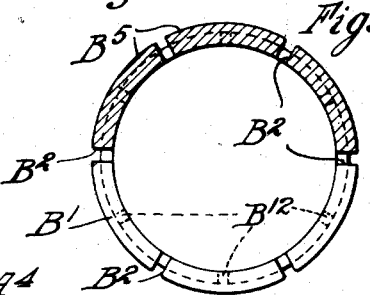
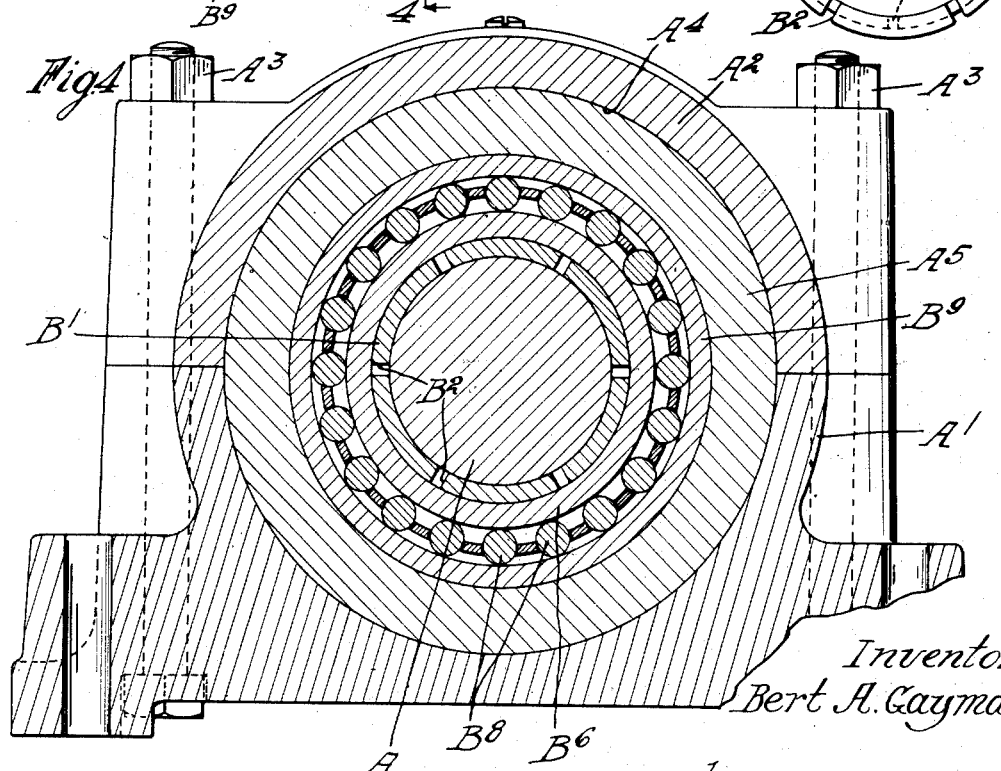
Inventor
Bert A. Gayman
by
Attorneys Patented Jan. 15, 1929.

1,699,330

UNITED STATES PATENT OFFICE.

BERT A. GAYMAN, OF SAN MATEO, CALIFORNIA, ASSIGNOR TO LINK-BELT COMPANY, OF CHICAGO, ILLINOIS, A CORPORATION OF ILLINOIS.

SLEEVE FOR ROLLER BEARINGS.

Application filed December 6, 1926. Serial No. 152,744.

REISSUED

My invention relates to an improvement in mounting double roller bearings upon a shaft over the methods now in vogue, which in general fall into two distinct types as follows:

First,—the shaft is carefully finished at considerable expense by turning or grinding to very accurate dimensions to fit the standard anti-friction bearing. It is impossible to use this method for mounting anti-friction bearings on commercial shafting because commercial shafting varies considerably in diameter and a standard bearing would be either too small to be applied or too loose to fit shafting as ordinarily offered the trade.

Second,—the anti-friction bearings are mounted on a sleeve whose inside diameter is sufficiently greater than the outside diameter of the largest variation in the diameter of commercial shafting so that the sleeve can be slipped over it. The projecting ends of this sleeve are then clamped or otherwise fastened to the shaft. The clearance between the sleeve and the shaft, particularly when the shaft is undersize, may be sufficient to cause the failure of the sleeve from deflection or crystallization because the sleeve is anchored to the shaft outside the bearing and the load has to be transferred through the sleeve.

In carrying out my invention I propose to interpose between the inner race of both of the bearings and the shaft a sleeve having a tapered surface, the inner periphery of the inner race having also a tapered surface conforming to the tapered surface on the sleeve. The inside diameter of this sleeve is sufficiently large to pass over commercial size shafting and by drawing it through the tapered race the sleeve is made to clamp the shaft rigidly with the result that there is a continuous mass of metal interposed between the shaft and the race, the parts being all rigidly held together. Thus there is a direct contact and a direct transfer of the load from the shaft through the sleeve to the race. Other objects will appear from time to time throughout the specification and claim.

My invention is illustrated more or less diagrammatically in the accompanying drawings, wherein—

Figure 1 is a section on a plane parallel with the axis of the shaft;

Figure 2 is a detail side elevation of one of the sleeves;

Figure 3 is a section along the line 3—3 of Figure 2;

Figure 4 is a section along the line 4—4 of Figure 1.

Like parts are indicated by like characters throughout the specification and drawings.

A is the shaft, $A^1$ is the lower portion of a pillow block, $A^2$ the cap held in place by bolts $A^3$. The pillow block has an interior spherical surface $A^4$ in which the filler sleeve $A^5$ is permitted a certain amount of movement to prevent binding of the shaft and bearing. The inner periphery of this sleeve $A^5$ is cylindrical and always in line with the shaft.

B $B^1$ are expanding sleeves slotted at $B^2$ and $B^{12}$ with their outer ends threaded at $B^3$. The interior portion of each sleeve is cylindrical and conforms generally in diameter to the diameter of the shaft. The slotted portion of the sleeve has an outwardly inclined or tapered surface $B^4$. These slots $B^2$ $B^{12}$ are staggered so that both the threaded and the tapered portion is slotted and since these slots overlap a very large degree of constriction of the sleeve is permitted. A portion of each sleeve has an extension $B^5$ extending beyond the largest diameter of the tapered portion so that the outer portion of each sleeve interlocks with a portion of the other whereby the relative rotation of the two sleeves is prevented. $B^6$ $B^6$ are inner roller bearing races having tapered surface $B^7$ to conform to and engage the tapered surface on the sleeve. $B^8$ $B^8$ are roller members located between the inner races $B^6$ and outer races $B^7$, these outer races being in engagement with the cylindrical portion of the sleeve $A^5$.

Associated with the outer ends of each of the sleeves B $B^1$, are clamping nuts C. These clamping nuts surround the shaft and are interiorly threaded to engage the threaded portion $B^3$ on the sleeve. When these nuts are rotated with respect to the sleeves they engage the sides of the inner roller races and draw the sleeve down the inclined portion of the inner roller races, thereby constricting the slotted portion of the sleeve and clamping the race and sleeve rigidly in position on the shaft. The fact that the two sleeves interlock makes it possible to prevent the turning of the sleeve with the nut, and thus preventing the screwing of the nut into its position on the sleeve.

$C^1$ is a set screw whereby the sleeve may be locked on the shaft to prevent rotation after it has been tightened up. $C^2$ $C^2$ are filler rings closing the open end of the sleeve $A^3$. They have oil channels $C^3$ in working engagement with the outer periphery of the clamp nut, to seal the lubricant in the bearing, and cylindrical spacer means $C^4$ engaging the outer ends of the roller races to position them in the sleeve. Cap screws $C^5$ are provided to hold these filler rings in place and shims $C^6$ are used to prevent forcing the filler rings too far in and binding the bearings.

Obviously but a single sleeve and bearing could be used if it were desired to use but a single bearing and equally obvious ball bearings or plain cylindrical bearings instead of tapered bearings might be used, it being only necessary to modify any of these types of bearings by providing a tapered inner surface on the inner race to engage the tapered surface on the split sleeve.

I claim:

A mounting for anti-friction bearings and the like comprising a pair of opposed annular rings adapted to encircle a shaft, each ring having a central exteriorly tapered portion and a cylindrically threaded portion beyond the reduced end of the tapered portion, each ring also having a semi-circular cylindrical portion projecting beyond the large end of the tapered portion whereby the two semi-circular cylindrical portions may interlock to hold the rings against relative rotation, slots extending through the tapered portion of each ring to the threaded cylindrical portion alternately with slots extending through the threaded cylindrical portion into the tapered portion, a pair of interiorly tapered anti-friction bearing races adapted to engage, one to engage the tapered portion of each of the sleeves, collars in threaded engagement with the threaded portion of the sleeves adapted to abut against the outer edges of the anti-friction bearing races to longitudinally displace the sleeves with respect to the bearing races to clamp the sleeves and races in position on the shaft.

Signed at San Francisco, county of San Francisco and State of California, this 24th day of November, 1926.

BERT A. GAYMAN.